United States Patent Office 3,078,221
Patented Feb. 19, 1963

3,078,221
HYDROGENATION PROCESS FOR PREPARATION OF LUBRICATING OILS
Harold Beuther and Richard A. Flinn, Penn Hills Township, Allegheny County, Alfred M. Henke, Springdale, and Joseph B. McKinley, New Kensington, Pa., assignors to Gulf Research & Development Company, Pittsburgh, Pa., a corporation of Delaware
No Drawing. Filed July 24, 1959, Ser. No. 829,216
7 Claims. (Cl. 208—111)

This application is a continuation-in-part of our copending application Serial Number 722,634, filed March 20, 1958, now abandoned.

This invention relates to catalyst compositions and their preparation and to processes for the use of these catalysts. More particularly this invention relates to supported catalyst compositions and their preparation and to processes for the use of these catalysts in the hydrotreatment of lubricating oil stocks.

The upgrading of lubricating oil stocks by catalytic hydrogenation has two important objectives. These two objectives are the attainment of an increased viscosity index and a decreased iodine number in the treated lubricating oil product. Viscosity index indicates the effect of change of temperature on the viscosity of an oil. A high viscosity index lubricant exhibits a relatively small change of viscosity with temperature and such a lubricant, therefore, tends to retain good viscosity characteristics under the increased temperatures to which it is subjected in an automobile engine.

The iodine number of an oil is an indication of the amount of unsaturated bonds present in either straight chain or cyclic molecules present in the oil at which iodine can be added. It is desirable to maintain the iodine number of an oil as low as possible since molecules having such unsaturated bonds have low oxidation stability and will cause deposit forming deterioration at the elevated temperature conditions existing in an engine during operation. Accordingly, it is seen that any upgrading process for lubricating oils should produce an oil having a relatively high viscosity index and a relatively low iodine number since each of these characteristics indicates that the oil will retain superior lubricating qualities under the elevated temperature conditions encountered during use.

One method of upgrading a lubricating oil stock is to subject the oil to a catalytic hydrogenation treatment. For a catalyst to be suitable in such a hydrogenation treatment it must be effective for the upgrading of the lubricating oil stock by producing a lubricant product possesing both a lower iodine number and a higher viscosity index. For the reduction of iodine number, the catalyst used must possess activity for the hydrogenation of unsaturated bonds since a low iodine number indicates a high degree of saturation. This type of catalyst activity is known as hydrogenation activity. In order to be effective for the production of a lubricating oil having an increased viscosity index, the catalyst must possess ring-scission activity. Ring-scission is a very selective type of cracking whereby the fused rings in a molecule are cracked open in the substantial absence of cracking or removal of alkyl side chains. The occurrence of ring-scission rather than cracking or removal of side chains is evidenced by the fact that analysis shows the average number of aromatic and saturated rings per molecule is reduced while the average molecular weight remains relatively constant. Generally, a catalyst having ring-scission activity will crack open the fused rings in a group leaving at least one ring in a group unopened and will not tend to open individual rings not fused with other rings in the molecule. The treatment of a lubricating oil charge stock to produce a product having a reduced number of fused rings per molecule without an appreciable change in the molecular weight of these molecules imparts a higher viscosity index to the oil.

Compositions containing metals of group VIII and the left hand column of group VI are active catalysts for the hydrogenative upgrading of lubricating oil stocks. It has now been discovered that these catalysts are greatly improved by disposing them upon a carrier material possessing a degree of catalytic cracking activity as specified below and by sulfiding. When these catalysts are disposed upon a carrier material having a degree of catalytic cracking activity as specified below and are sufided they not only possess excellent hydrogenation activity and ring-scission activity but are more easily regenerable and have surprisingly superior aging characteristics as compared to the unsupported form.

We have discovered that when group VIII and left hand column group VI metals are disposed upon a carrier material as described are sulfided the resulting catalysts are especially valuable for the preparation of lubricating oils by hydrogenation. The catalysts of this invention have the important advantage over unsupported catalysts that they can be regenerated more effectively and more economically. However, because of the long life characteristic of the catalysts of this invention, they may be employed for extremely long throughput intervals before regeneration becomes necessary.

The catalyst compositions of this invention comprise sulfided group VIII and left hand column group VI metals disposed upon a carrier material having catalytic cracking activity as described below. Examples of suitable metals of the left hand column of group VI are chromium, molybdenum and tungsten, and examples of suitable group VIII metals are iron, cobalt and nickel. Preferably the left hand column group VI metal is tungsten and preferably the group VIII metal is nickel.

The amount of group VIII plus left hand column group VI metals present in the catalyst should be 5 percent to 40 percent of the total catalyst weight, expressed as pure metals. Preferably, the group VIII and the left hand column group VI metals present should comprise 10 percent to 25 percent of the total catalyst weight. The atomic ratio of the left hand column group VI metal to the group VIII metal should be between 1 atom of left hand column group VI metal to 0.1 atom of group VIII metal and 1 atom of left hand column group VI metal to 5 atoms of group VIII metal, generally, but is preferably within the range of 1 atom of left hand column group VI metal to 0.3 atom of group VIII metal and 1 atom of left hand column group VI metal to 4 atoms of group VIII metal.

The group VIII and the left hand column group VI metals are present in some form of combination or mixture with sulfur. We have found that the amount of sulfur present in the catalyst is preferably between 2 percent and 23 percent of the catalyst weight. More preferably, the amount of sulfur on the catalyst is equivalent to that amount of sulfur necessary to convert at least about 35 percent of the active metals to their sulfides and, most preferably, the amount of sulfur on the catalyst is equivalent to that amount of sulfur necessary to convert between about 50 and 63 percent of the active metals to their sulfides.

The carrier material employed should be one possessing a specified degree of catalytic cracking activity which can be conveniently defined by relating it to the Kellogg cracking activity scale, developed by The M. W. Kellogg Company. This scale defines cracking activity as percent by volume of conversion obtained by passing a standard charge stock through the catalyst under standard test conditions. The Kellogg cracking activity scale is explained in "Physical, Chemical and Catalytic Testing of Diakel Powdered Cracking Catalyst," a technical report of the Petroleum Research Division of The M. W. Kellogg Company, dated June 7, 1943. The carrier materials used in this invention possess a cracking activity generally equivalent to a rating of at least about 12 percent as defined by the Kellogg scale. Preferably, the carrier to be employed should be one which has an activity for cracking equivalent to a rating of 35 percent to 80 percent on the Kellogg scale. These values relate to the cracking activity of the carrier itself in an unpromoted state and in the form in which it exists when it is impregnated with the active metals.

To determine the Kellogg cracking activity of a catalyst, the catalyst is tested as a powder under the following cracking conditions:

| | |
|---|---|
| Feed | 35° A.P.I. Mid-Continent gas oil. |
| Catalyst temperature | 850±5° F. |
| Pressure | Atmospheric. |
| Catalyst charge | 710 grams. |
| Oil rate | 500±20 cubic centimeters per hour. |
| Velocity—inlet conditions | Approximately 0.1 feet per second. |
| Weight of oil per hour per weight of catalyst bed | 0.6±0.02. |
| Length of cracking test | 2 hours. |
| Blowdown nitrogen | 3 cubic feet per hour (0.2 linear feet per second). |

The oil feed used in the cracking test is a light Mid-Continent gas oil with the following typical inspections:

| | |
|---|---|
| Gravity—° A.P.I. | 34.8 |
| A.S.T.M. distillation: | |
| IBP—° F | 468 |
| 5% | 512 |
| 10% | 521 |
| 20% | 534 |
| 30% | 546 |
| 40% | 562 |
| 50% | 578 |
| 60% | 595 |
| 70% | 618 |
| 80% | 647 |
| 90% | 686 |
| 95% | 720 |
| E.P. | 748 |
| Aniline Point—° F | 171 |
| Sulfur—weight percent | 0.29 |

The allowable variations of oil feed inspections are as follows:

| | |
|---|---|
| Gravity—° A.P.I. | 35±1 |
| A.S.T.M. Distillation—° F.: | |
| 10% | 520±10 |
| 50% | 580±10 |
| 90% | 690±10 |
| E.P. | 750±25 |

The catalyst to be tested is heat treated at 850° F. for a two hour period before testing. This heat treatment is accomplished by filling a steel dish with 1100 grams of the catalyst under investigation and inserting it into a circulating air muffle furnace which has been preheated to 850±5° F. The catalyst should remain in the circulating air muffle furnace for two hours with the air stream flowing. The catalyst is then removed from the furnace.

The powdered catalyst test apparatus consists of a tubular reactor with a preheating coil and filter, a furnace, oil feed tank and pump, condenser, receiver and knockback trap, gas meter, and accessory equipment. In operating this test equipment, the reactor and preheating coil is mounted within the furnace and oil is pumped from the feed tank through transfer valves into the preheater coil. Oil vapors enter the reactor through a small orifice at the bottom of the fluid bed and flow upward. The cracked products leaving the bed pass into an enlarged settling zone, through a filter in the top of the reactor and through a condenser into a receiver situated in an ice water bath. Gases leaving the receiver pass through a knockback column cooled to −40° F. and then through a gas meter to a product gas holder.

The test reactor consists of a section of 1¼ inch pipe which is 4 feet, 9 inches in length, surmounted by a 6 inch section of 2 inch pipe containing a glass wool filter. A preheater coil consisting of 10 feet of ¼ inch O.D. tubing is wound on the outside of the 1¼ inch pipe and connects with a small orifice in the conical bottom attached to the latter.

In preparing for the test, nitrogen is passed through the preheater coil and the reactor at a rate of 2 cubic feet per hour which is approximately equivalent to the oil vapor rate during the run. The catalyst is then slowly charged into the reactor and the reactor is then secured within the heated furnace. The receiver in the recovery system is held at 32° F. with wet ice and the knockback traps are held at −40° F., with a 50–50 mixture of ethyl glycol and water cooled with Dry Ice.

A two hour cracking test is then conducted under the conditions outlined above employing a charge stock as specified. After this test is concluded, a nitrogen blowdown of 3 cubic feet per hour should be continued for 30 minutes. The liquid product is then drawn from the receiver into a chilled bottle, weighed and placed in an ice box. A few minutes should be allowed for any liquid holdup in the knockback to drain out. The reactor is then removed from the furnace and the catalyst is poured into a container and weighed.

At the completion of the cracking test, three products are available for analysis—total liquid, total gas and spent catalyst. The specific gravity of the liquid product expressed as ° A.P.I. should be taken at 35–40° F. according to A.S.T.M. procedure Serial Number D–287–39t. The distillation of the liquid test product should be carried out according to A.S.T.M. method D86–40 appearing in "Distillation of Gasoline, Naphtha, Kerosene and Similar Petroleum Products" (the distillation procedure to be employed for the gas oil charged to the test unit is A.S.T.M. test D158–4 appearing in "A.S.T.M. Standards for Petroleum Products and Lubricants"). The analysis of the gas products from the test unit which consist of carbon dioxide, hydrogen sulfide and air should be carried out according to the Orsat method. A gas density determination should be made by the Edwards balance method. A carbon analysis determination of the spent catalyst is made by burning the sample in a stream of oxygen, absorbing the $CO_2$ produced and determining the weight of $CO_2$ absorbed. It may be necessary to extract oil from the catalyst prior to the carbon analysis. This is accomplished by washing with 100–150 cubic centimeters alcohol followed by 100–150 cubic centimeters of 95 percent carbon tetrachloride. This is followed by drying in an oven at 375° F. to 400° F. overnight. After drying, the carbon content of the extracted catalyst is then determined. The amount of oil extracted is determined by evaporating the extract until no trace of carbon tetrachloride or alcohol is detected. The residue remaining is the oil removed from the catalyst.

A weight balance should be made. One hundred times the total weight of liquid product plus gas product plus carbon divided by the weight of oil feed is the weight balance in percent. For a test unit operation to be acceptable, the weight balance should be between 95 and 100 percent.

The Kellogg activity rating of the catalyst is expressed as volume percent conversion obtained under the standard test conditions. The activity rating can be calculated from the test results as follows:

$$\frac{\text{Total liquid product (grams)}}{\text{Liquid product specific gravity}} = \text{milliliters liquid product}$$

$$\frac{\text{Liquid product (milliliters)} \times \text{volume percent distillate plus loss at } 400° \text{ F.}}{100} = \text{milliliters gasoline}$$

$$\frac{\text{Total oil feed (grams)}}{\text{Feed specific gravity}} = \text{milliliters oil feed}$$

$$\frac{\text{Milliliters gasoline}}{\text{Milliliters oil feed}} \times 100 = \text{gasoline yield volume percent}$$

$$\text{Milliliters liquid product} - \text{milliliters gasoline} = \text{milliliters cycle oil}$$

$$\frac{\text{Milliliters cycle oil}}{\text{Milliliters oil feed}} \times 100 = \text{cycle oil volume percent}$$

100 volume percent cycle oil

= conversion volume percent

= Kellogg cracking activity in percent

In accordance with our invention the material employed as a support in our improved lubricating oil catalysts should possess an activity for cracking equivalent to a rating of 12 percent to 80 percent as defined by the Kellogg scale and preferably should possess an activity for cracking corresponding to a rating of 35 to 80 percent as defined by the Kellogg scale. Although catalysts having an activity for cracking equivalent to a rating of 12 percent to 80 percent as defined by the Kellogg scale include the common commercial catalysts used to accomplish random splitting of carbon to carbon bonds such as is necessary for the production of gasoline, the surprising discovery has now been made that when such materials are employed as supports in the lubricating oil hydrogenation catalysts of this invention their activity is highly selected toward ring-scission rather than the random type of cracking activity they exhibit when otherwise used. Although our invention is not limited by any particular theory, it is believed that the reason the supporting material employed should possess at least some catalytic cracking activity is so that it can contribute to the ring-scission activity of the catalyst. On the other hand, although catalysts having an activity for cracking above 80 percent on the Kellogg scale can be employed, it is preferable that the cracking activity of the support does not range appreciably above 80 percent on the Kellogg scale since a support possessing excessive cracking activity may effect substantial concomitant cracking of aliphatic portions of the molecule and thereby greatly reduced the portion of yield which can be employed as a lubricant. According to this theory, the most desirable lubricating oil hydrotreating catalysts are those catalysts which possess an activity for cracking sufficient to accomplish ring-scission but insufficient for concomitant excessive cracking of aliphatic portions of the molecule.

The cracking activity of the preferred supporting materials of this invention can also be related to the volume percent of gasoline yield obtained when carrying out the Kellogg test. As described above, the gasoline yield in volume percent is calculated from the Kellogg test results and this calculation is one step in the calculations necessary to determine the Kellogg cracking activity itself. The supporting materials of this invention possess catalytic cracking activity such that at least 10 percent by volume of gasoline is produced according to the Kellogg test and preferably possess catalytic cracking activity such that between 30 and 50 volume percent of gasoline is produced in accordance with the Kellogg test.

The supporting material to be employed in accordance with this invention is not limited to any particular composition. Either synthetic or natural carriers can be employed. Also, materials other than alumina and silica containing compositions can be employed. For example, the use of a silica-magnesia base resulted in a catalyst as active as a similar catalyst employing a silica-alumina base. However, materials selected from the group consisting of alumina, silica, and composites of silica and alumina are useful as supports for the catalysts of this invention and of these materials selected from the group consisting of alumina and composites of alumina and silica have been found to be especially useful. The composites of silica and alumina are especially advantageous support compositions and, of these, compositions containing between 1 and 99 percent silica are desirable, compositions containing between 5 and 90 percent silica are more desirable and compositions containing between 65 and 90 percent silica are most desirable, the remainder in each case comprising alumina. Whatever composition is employed as a supporting material in the catalyst of this invention it must possess an activity for cracking corresponding to a rating of 12 to 80 percent on the Kellogg scale.

It is important that whatever is the composition of the carrier material, no substance should be present which is capable of undesirably deactivating its cracking activity or, on the other hand, capable of causing its cracking activity to become excessively random. For example, the presence of certain metals in a cracking catalyst has a disruptive effect upon good cracking characteristics. Calcium is an example of such a metal and it was found that a catalyst employing as a support calcium-alumino silicate in which the carrier material comprised 90 percent alumino silicate was ineffective for the hydrotreatment of lubricating oils.

We have found that slight variations in cracking activity of a catalyst support of this invention in the region corresponding to a cracking activity of about 12 on the Kellogg cracking activity scale result in especially wide varations in the quality of a lubricating oil product. For example, we have found that a catalyst having a supporting material whose catalytic cracking activity is slightly greater than 12 on the Kellogg cracking activity scale produces a lubricating oil having a much higher viscosity index as compared to a similar catalyst having as a supporting material a substance whose cracking activity is slightly below 12 on the Kellogg cracking activity scale.

It is noted that the cracking activity of a sample of material of a given composition can vary widely from the cracking activity of another sample of material of the same composition. The cracking activity of each sample can vary due to the prior treatment of the sample, such as heat to which it is subjected, etc. We have discovered that samples of materials having identical compositions, but having cracking activities which differ slightly in the region corresponding to a Kellogg cracking activity of 12 result, when employed as supports in the compositions of this invention, in catalysts having widely variant activities.

The group VIII and left head column group VI metals are present in some form of combination or mixture with sulfur. The amount of sulfur on the catalyst can vary within wide limits. For example, the amount of sulfur present in the catalyst can range from as low as 0.5 to 2.0 percent or lower to as high as 23 percent or higher, based on the total catalyst weight, with a 2 to 23 percent range being advantageous. The weight percent of sulfur on the catalyst depends on the active metals which are employed, their amount and the manner in which sulfiding is performed.

Although good results are achieved by employing a catalyst having a sulfur content generally within these broad limits, we have found that when the sulfiding operation occurs following impregnation of the support with the total active metal content and calcination the yield of lubricating oil product can be increased by maintaining the sulfur content of the catalyst within a more narrow range. For example, greatly increased yields of lubricating oil are produced when employing a catalyst which has been sulfided following impregnation and calcination of the total active metal content wherein the sulfidation proceeds to an extent such that the finished catalyst contains a quantity of sulfur equivalent to the amount required to convert between 35 and 100 percent of the active metals present to their sulfides. Most preferably, the amount of sulfur on the catalyst should be equivalent to the amount required to convert about 50 to 63 percent of the active metals to their sulfides.

When the entire sulfiding operation occurs after all the active metals have been impregnated upon the support and calcined, the only sulfur that can adhere to the catalyst with any substantial degree of permanence when it is onstream is the sulfur which chemically combines with the active metals to form the sulfides of these metals. Generally, the supporting material is substantially nonreactive in the presence of the sulfiding agent. Unless especially severe sulfiding conditions are employed the maximum amount of sulfur that can ordinarily be retained by a catalyst which has been sulfided following impregnation of the support with the total active metal content and calcination is that quantity of sulfur required to completely convert the active metals present to the sulfide form. For example, if the active metals are nickel and tungsten, the maximum quantity of sulfur that can be deposited under ordinary sulfiding conditions is that quantity required to theoretically convert tungsten to tungsten disulfide and nickel to nickel sulfide. Especially severe sulfiding conditions would have to be employed to deposit a quantity of sulfur greater than the amount required to convert all the tungsten to tungsten disulfide and all the nickel to nickel sulfide. When discussing a catalyst wherein the total sulfiding is accomplished following complete impregnation of the support with the active metals and calcination, which is the preferred method of sulfiding, it is therefore convenient to express the sulfur content of the catalyst in terms of the percent of active metals in the catalyst which are converted to their sulfides.

If it is desired to deposit considerably more sulfur upon the catalyst than can be deposited by sulfiding following impregnation and calcination of the total active metal content, the sulfiding operation can be carried out in stages wherein alternating impregnation and sulfidation steps are performed. For example, if the catalyst is sulfided in stages, one sulfiding stage occurring after the supporting material has been impregnated with one active metal and dried but not calcined, followed by another sulfiding stage occurring after impregnation of the support with another active metal and drying without calcining, the quantity of sulfur contained on the catalyst can range considerably above the amount contained in a catalyst having active metals within the ranges of this invention wherein between 35 and 100 percent of these metals are converted to the sulfide. In one example, when sulfiding in stages and without calcination in this manner a catalyst was produced containing 131 percent of the sulfur theoretically required to convert the active metals to the sulfide. However, the catalyst produced by the stagewise sulfiding operation possesses a serious disadvantage in that it is physically unstable onstream during the hydrotreating process as compared to a catalyst prepared by sulfiding after the support has been impregnated with the total active metal content.

When sulfiding occurs between impregnation steps the finished catalyst can contain considerably more sulfur than a catalyst prepared by total impregnation of active metals followed by calcination and sulfiding since some uncombined sulfur can become entrapped between metal layers. This entrapment of uncombined sulfur may account for the physical instability of a catalyst prepared in this manner.

When the catalyst of this invention is sulfided in accordance with the preferred method, that is, after impregnation of the support with the total active metal content and calcination and when the catalyst contains the most preferred amount of sulfur, that is, between 50 and 63 percent of the sulfur required to convert the active metals to the sulfides, although no increase of viscosity index as compared to other sulfided catalyst is achieved, a substantial increase in yield of lubricating oil at a given viscosity index is produced as compared to a similar catalyst prepared in like manner but having a sulfur content above or below this range. It appears therefore that a cooperative effect between the cracking-type support and the sulfur in the preferred catalyst may exist. Although we do not wish to be bound by any particular theory, the sulfur present may tend to render the cracking activity of the support more selective towards ring-scission rather than random cracking and tend to diminish the amount of random cracking caused by the cracking type supporting material of this invention. This is evidenced by the fact that employing a catalyst having the preferred sulfur range does not result in a catalyst capable of producing a higher viscosity index oil, thereby indicating that the preferred sulfur range in itself does not exhibit catalytic activity, but rather results in a catalyst capable of producing an increased yield of lubricating oil of a viscosity index level which is attainable with a similar catalyst wherein the sulfur content is outside the preferred range. Therefore, it appears the preferred range of sulfur serves to constructively channel the catalytic activity of the supporting material.

According to the process of our invention a catalyst comprising sulfided left hand column group VI and group VIII metals supported upon a carrier material having an activity for cracking corresponding to a rating of at least 12 on the Kellogg activity scale is contacted with a stream of deasphalted liquid hydrocarbon charge oil which is heavier than the desired lubricating oil product in admixture with a stream of hydrogen under hydrotreating conditions of temperature, pressure and hydrogen-charge oil ratio. By hydrotreating conditions we mean those conditions of temperature, pressure and hydrogen-charge oil ratio which are favorable for the furtherance of hydrogenation activity and ring-scission activity. The charge stock should first be deasphalted in order to produce a higher quality lubricating oil and also to hold coke formation to a minimum, thereby reducing fouling of the catalyst. The passage of liquid hydrocarbon charge and hydrogen can be maintained in continuous onstream operation substantially longer with supported catalysts than with unsupported catalysts, since the supported catalysts of this invention age much more slowly than the unsupported form.

Any method may be employed for the preparation of the catalyst compositions of this invention. For example, the carrier material can be impregnated with a solution containing a salt of a left hand column group VI metal and a salt of a group VIII metal. The proportions of the salts placed in solution are adjusted to produce a catalyst containing the desired total amount of metals and the desired ratio of metals to each other. The impregnated carrier is then dried at a temperature sufficiently high to reduce the impregnated metals to the form of the oxide. The catalyst is then sulfided by treatment with a sulfur containing gas such as hydrogen sulfide.

Table 1 shows the comparative aging characteristics of a supported presulfided nickel-tungsten catalyst and an unsupported nickel-tungsten sulfide catalyst when each is used in the hydrotreating process of this invention employing a deasphalted residuum as a charge stock to produce SAE 10W/20 and SAE 20W/30 motor oils. In the example shown in Table 1, the process conditions are a pressure of 3600 pounds per square inch gauge, a space velocity of 0.5 liquid volumes of hydrocarbon charge per volume of catalyst per hour and a hydrogen recycle gas rate of 5000 standard cubic feet per barrel having a 95 volume percent hydrogen content. The unsupported catalyst employed is nickel-tungsten sulfide containing a 4 to 1 atomic ratio of nickel to tungsten. The 4 to 1 nickel to tungsten ratio was employed for purposes of comparison since it is one of the most active unsupported forms of this catalyst. The supported catalyst is a sulfided nickel-tungsten composition containing 25 percent by weight of nickel and tungsten in an atomic ratio of 0.5 to 1 and supported on a support designated as Triple A which is manufactured by the American Cyanamid Company and which contains 25 percent alumina and 75 percent silica. The activities of both the supported and unsupported catalysts are indicated in terms of the average catalyst temperature needed to maintain the activity of the catalyst undiminished as the total throughput is increased. In other words, Table 1 shows the temperature required to compensate for loss of catalyst activity during the aging of the catalyst in order to produce a constant quality multi-grade lubricating oil product.

*Table 1*

| Catalyst age, volume charge per volume catalyst | Average catalyst temperature required to produce a uniform SAE 10W/20 and SAE 20W/30 product, °F. | |
|---|---|---|
| | Supported catalyst, sulfided nickel-tungsten on a 75 percent silica-25 percent alumina support | Unsupported catalyst, nickel-tungsten sulfide |
| 0 | 781 | 754 |
| 50 | | 755 |
| 100 | 781.8 | 759 |
| 150 | | 762 |
| 200 | 782.2 | 763 |
| 250 | | 764 |
| 300 | 783 | 766 |
| 350 | | 770 |
| 400 | 783.3 | 772 |
| 450 | | 774 |
| 500 | 784 | 776 |
| 550 | 784 | 779 |
| 600 | 784 | 782 |
| 650 | 784 | 784 |
| 700 | 784 | 787 |
| 750 | 785 | 792 |
| 800 | 785 | 793 |
| 850 | 786 | 793 |
| 900 | 787 | 795 |
| 950 | 787 | 796 |
| 1,000 | | 798 |
| 1,050 | | 799 |
| 1,100 | | 800 |
| 1,150 | | 801 |
| 1,200 | | 804 |
| 1,250 | | 807 |

The initial activity of the supported catalyst is lower than the activity of the unsupported catalyst as shown by the 781° F. versus 754° F., respectively, initial temperatures needed for each of these catalysts to produce the same quality product. However, the activity of the unsupported catalyst declines at a much faster rate than that of the supported catalyst. After about 500 to 700 volumes of charge oil per volume of catalyst have passed through the system, the supported catalyst becomes comparable in activity to the unsupported form. As shown in Table 1, at a total throughput of 650 volumes of charge oil per volume of catalyst, which occurred after about eight weeks of continuous operation, the reaction temperatures required for each catalyst to produce a constant quality product merge at about 784° F. The increase in temperature needed by the unsupported catalyst to maintain its activity is about 4.5° F. per week at a charge oil space velocity of 0.5 liquid volume of hydrocarbon charge per hour per volume of catalyst as compared to only 0.6° F. per week at the same space velocity for the supported catalyst. It is noted that high temperatures are undesirable since they tend to alter the selectivity of cracking from the ring-scission type which is necessary for the production of high quality lubricating oil to the random type of cracking which results in the production of gasoline. Table 1 shows that the supported sulfided nickel-tungsten catalyst has greatly superior aging characteristics as compared to the unsupported form and that after about 500 to 700 volumes of charge per volume of catalyst have passed through the system, the supported form requires less severe temperatures than the unsupported form to produce the same constant quality multi-grade lubricating oil product.

It has also been discovered that the supported lubricating oil hydrotreating catalysts of this invention are substantially unaffected by changes in hydrogen content of the charge gas stream whereas the unsupported form is extremely sensitive to any change in the hydrogen content of the charge gas stream and experiences a greatly increased aging rate upon such a change in process conditions. For example, parallel tests were performed employing a nickel-tungsten sulfide unsupported catalyst having a 4:1 nickel to tungsten ratio and a sulfided nickel-tungsten catalyst disposed upon an American Cyanamid Company Triple A support, the nickel and tungsten comprising 25 percent of the total catalyst weight in a 0.5:1 nickel to tungsten ratio. In each test, a deasphalted residuum was treated at temperatures required to produce SAE 10W/20 and SAE 20W/30 motor oil at a pressure of 3600 pounds per square inch gauge, a space velocity of 0.5 liquid volume of hydrocarbon charge per volume of catalyst per hour, and with a charge gas stream of 5000 standard cubic feet per barrel having a 95 percent hydrogen content. Under these steady state conditions the unsupported catalyst exhibited an aging rate of 4.5° F. per week while the supported form exhibited an aging rate of 0.6° F. per week. Upon abruptly decreasing the hydrogen content of the charge gas stream in each test from 95 percent to 85 percent, the unsupported catalyst exhibited an abrupt change in aging rate from 4.5° F. temperature increase per week to 8.5° F. temperature increase per week required to maintain a 10W/20 and a 20W/30 motor oil product while no appreciable change in process temperature for about 3 weeks following this change in process condition was required in the case of the supported catalyst to maintain the quality of the lubricating oil product unchanged.

Table 2 contains the results of various tests made to illustrate the use of various supporting materials in the catalysts of this invention. As shown in Table 2, sulfided nickel-tungsten catalysts were prepared which were identical except that each had a different supporting material. Each catalyst was employed in the hydrotreatment of portions of the same lubricating oil stock at 730° F. The lubricating oil stock comprised a blend containing two-thirds Ordovician unpressable distillate and one-third deasphalted residuum. The viscosity index of the charge was 99 and the iodine number was 14.1. The specific gravity of the charge stock was 25.1° A.P.I. and the viscosity was 665 SUV:secs. at 100° F. and 72.8 SUV: secs. at 210° F. The hydrotreating reaction conditions included a pressure of 3000 pounds per square inch gauge, a space velocity of 0.5 volume of hydrocarbon charge per hour per volume of catalyst and a hydrogen circulation rate of 5000 standard cubic feet per barrel on a once-through basis.

Table 2

| Basic catalyst: Sulfided nickel-tungsten. | Nickel and tungsten comprising 25 percent of the total catalyst weight and having a 1:1 nickel to tungsten atomic ratio. | Nickel and tungsten comprising 25 percent of the total catalyst weight and having a 1:1 nickel to tungsten atomic ratio. | Nickel and tungsten comprising 25 percent of the total catalyst weight and having a 1:1 nickel to tungsten atomic ratio. |
|---|---|---|---|
| Catalyst support | Triple A manufactured by American Cyanamid Company. | MSA manufactured by American Cyanamid Company. | H-42 manufactured by the Aluminum Company of America. |
| Support composition | 75 weight percent silica, 25 weight percent alumina. | 85 weight percent silica, 15 weight percent alumina. | 5 weight percent silica, 95 weight percent alumina. |
| Pretreatment of catalyst support | Calcined at 1,000° F. for 10 hours | Calcined at 1,000° F. for 10 hours | Calcined at 1,000° F. for 10 hours. |
| Catalyst cracking activity of support: Expressed as Kellogg cracking activity in percent. | 73.9 | 68.1 | 29.7. |
| Expressed as gasoline yield in volume percent as determined by the Kellogg test. | 46.6 | 47.5 | 22.7. |
| Product: Viscosity index of lubricating oil treated at a catalyst temperature of 730° F. | 126 | 123 | 121. |
| Catalyst temperature in °F. required to produce a lubricating oil having a viscosity index of 125. | 731 | 735 | 741. |

| Basic catalyst: Sulfided nickel-tungsten | Nickel and tungsten comprising 25 percent of the total catalyst weight and having a 1:1 nickel to tungsten atomic ratio. | Nickel and tungsten comprising 25 percent of the total catalyst weight and having a 1:1 nickel to tungsten atomic ratio. | | | |
|---|---|---|---|---|---|
| Catalyst support | Harshaw activated alumina | H-44 manufactured by the Aluminum Company of America. | | | |
| Support composition | Over 99.5 percent by weight of alumina | Over 99.5 percent by weight of alumina. | | | |
| Pretreatment of catalyst support | Calcined at 1,000° F. for 10 hours | Calcined at 1,000° F. for 10 hours. | Steamed at 1,350° F., 15 pounds pressure, 8 hours. | Calcined at 1,700° F. | Treated with caustic to deposit 2 percent sodium. |
| Catalytic cracking activity of support: Expressed as Kellogg activity in percent. | 5.8 | 14.1 | 10.5 | 9.6 | 8.2. |
| Expressed as gasoline yield in volume percent as determined by the Kellogg test. | 5.3 | 11.5 | 8.6 | 7.9 | 7.2. |
| Product: Viscosity index of lubricating oil treated at a catalyst temperature of 730° F. | 107 | 120 | | 111 | |
| Catalyst temperature in °F. required to produce a lubricating oil having a viscosity index of 125. | Over 800 | 749 | | 776 | |

It is seen from Table 2 that the catalysts in which the support possessed an activity for cracking corresponding to a rating between about 12 percent and 80 percent on the Kellogg cracking activity scale and in which the gasoline yield in volume percent as determined by the Kellogg test ranged between about 10 and 50 were capable of producing the highest quantity lubricating oil product. For example, the Triple A, MSA, H-42 supports and the H-44 support which was calcined at 1000° F. for 10 hours, having Kellogg cracking activities of 73.9, 68.1, 29.7 and 14.1, respectively, and Kellogg gasoline yields in volume percent of 46.6, 47.5, 22.7 and 11.5, respectively, all produced lubricating oil products having a viscosity index of 120 or higher. It is noted that one purpose for calcining these catalyst supports at 1000° F. for 10 hours prior to use was to effect the removal of a small amount of carbon that was found to be present on these materials. On the other hand, the catalysts having as a support a material whose Kellogg cracking activity was below 12 and whose Kellogg gasoline yield in volume percent was below 10 all resulted in lubricating oil products having viscosity indices substantially below 120. For example, the catalyst employing the Harshaw activated alumina support and the catalyst employing the H-44 support which was calcined at 1700° F., having Kellogg cracking activities of 5.8 and 9.6, respectively, and Kellogg gasoline yields in volume percent of 5.3 and 7.9, respectively, produced lubricating oil products having viscosity indices of only 107 and 111, respectively.

Table 2 illustrates the advantage of employing a catalyst having a carrier material whose cracking activity is within the preferred range of this invention. Table 2 also shows that a material of a given composition can vary in cracking activity and this variance in cracking activity can be critical when employing the composition as a hydrotreating catalyst support. For example, H-44 alumina and Harshaw activated alumina each has substantially the same composition and yet when each is calcined at 1000° F. for 10 hours and employed as a hydrotreating catalyst support the resulting catalysts exhibit widely differing activities. It is also seen that when the H-44 supporting material itself is calcined at 1700° F. rather than 1000° F. a catalyst containing it as a support is greately inferior as compared to a catalyst containing the same composition which was calcined at 1000° F.

Table 3 shows the results of tests conducted to illustrate the effect of sulfiding on the catalysts of this invention. For purposes of comparison a group of similar silica-alumina impregnated with nickel and tungsten catalysts were prepared in which the support, comprising 75 weight percent silica and 25 weight percent alumina and manufactured by the Davison Chemical Company, was impregnated with the total active metal content and calcined before being subjected to further treatment. One of these catalysts was employed for testing without further treatment and in this catalyst the active metals were presumably in the form of the oxide. The other catalysts were sulfided under differing sulfiding conditions to produce catalysts having sulfur contents equivalent to various percent conversion of the active metals to their sulfides. In all the tests the nickel and tungsten employed in the catalyst comprised about 21 percent of the total catalyst weight in a nickel to trungsten atomic ratio of 1 to 0.6 and was promoted with 1.7 weight percent of fluorine.

These catalysts were then used to hydrotreat a blend containing two-thirds Ordovician unpressable distillate and one-third Ordovician deasphalted residuum. The properties of this blend were as follows:

Gravity _____ 23.8° API.
Viscosity:
    SUS at 100° F _____ 718.
    SUS at 210° F _____ 73.0.
Viscosity index _____ 91.
ASTM color (Union) _____ 8 (dilute).
Carbon residue (Conradson percent) _____ 0.66.
Iodine number _____ 13.2.
Percent sulfur _____ 0.30.

This blend was hydrotreated with the above noted various catalysts at temperatures between 650° and 745° F., a pressure of 3000 pounds per square inch gauge and a space velocity of 0.5 liquid volume of hydrocarbon charge per volume of catalyst per hour. The results of the hydrotreatments with the various catalysts are shown in Table 3. The lubricating oil products of the tests were topped at 725° F. and were not dewaxed prior to testing. It is noted that a temperature range, 650° to 745° F., is given for the hydrotreating tests since each catalyst was tested at four temperatures within this range, 650°, 715°, 730° and 745° F., and from the data taken at each temperature a yield-viscosity index curve was obtained for each catalyst and from this curve the yield of 125 and 130 viscosity index oil reported in Table 3 for each catalyst was obtained. It is also noted that the weight percentage of sulfur in each of the sulfided catalysts in Table 3 can be obtained by multiplying the percent of active metals theoretically converted to their sulfides by 8.73 percent, since a catalyst of the composition employed contains 8.73 percent by weight of sulfur when theoretically 100 percent of the active metals are sulfided.

perature of 600° F. and at atmospheric pressure. After cooling, the impregnated support was then impregnated wtih aqueous nickel acetate and oven dried for 95 hours and roasted again in hydrogen sulfide at the same conditions as above. The completed catalyst contained 18 percent by weight of nickel and tungsten in a nickel-tungsten atomic ratio of 1.0 to 1.2 and possessed 131 percent of the sulfur theoretically required to convert the metals to nickel sulfide and tungsten disulfide. The catalyst was tested by hydrotreating the same blend of Ordovician unpressable distillate and deasphalted residuum as was employed in the tests illustrated in Table 3. The hydrotreatments were carried out at temperatures of 650° to 745° F., 0.5 liquid hourly space velocity, a once through pure hydrogen rate of 5000 standard cubic feet per barrel and a 3000 pounds per square inch gauge pressure. Based on the results of these tests, a tabulation of viscosity index and iodine number of the lubricating oil produced at various hydrotreating temperatures and a tabulation of yield based on the percent volume of charge having both 125 and 130 viscosity indices were prepared and are shown in Table 4.

*Table 3*

| Catalyst | | | Lubricating oil product | | |
|---|---|---|---|---|---|
| Active metals not sulfided after calcination | Sulfided catalyst: Sulfur content expressed as percent of active metals theoretically converted to sulfide | Sulfiding conditions | Yield of 125 viscosity index oil: percent by volume of charge | Yield of 130 viscosity index oil: percent by volume of charge | Hydrotreating temperature required to produce a 125 viscosity index lubricating oil |
| Yes | 0 | | 61 | | 738 |
| | 23 | 10 percent by volume of hydrogen sulfide in hydrogen, 500° F | 65 | | |
| | 39 | 10 percent by volume of hydrogen sulfide in hydrogen, 600° F | 72 | | |
| | 47 | 50-50 percent by volume of hydrogen and hydrogen sulfide, 600° F., 2 atmospheres, 2 hours, 330 standard cubic feet per hour. | 70 | 61 | 734 |
| | 53 | 5 percent by volume of hydrogen sulfide in hydrogen, 600° F., 2 atmospheres, 6 hours, 330 standard cubic feet per hour. | 75 | 67 | 731 |
| | 59 | 10 percent by volume of hydrogen sulfide in hydrogen, 600° F., 2 atmospheres, 6 hours, 330 standard cubic feet per hour. | 75 | 67 | 730 |
| | 67 | 10 percent by volume of hydrogen sulfide in hydrogen, 600° F., 1 atmosphere, 8 hours. | 72 | 65 | 735 |
| | 70 | 50-50 percent by volume of hydrogen sulfide and hydrogen, 600° F., 2 atmospheres, 6 hours, 330 standard cubic feet per hour. | 70 | 60 | 735 |
| | 72 | 50-50 percent by volume of hydrogen sulfide and hydrogen, 600° F., 2 atmospheres, 6 hours, 500 standard cubic feet per hour. | 73 | | 734 |
| | 79 | 50-50 volume percent of hydrogen sulfide and hydrogen, 600° F., 5 atmospheres, 6 hours, 130 standard cubic feet per hour. | 69 | 61 | 734 |
| | 104 | 50-50 percent by volume of hydrogen sulfide and hydrogen, 900° F., 2 atmospheres, 6 hours, 425 standard cubic feet per hour. | 69 | 56 | 739 |

Table 3 shows that, in respect to a yield-viscosity index basis, the catalysts which were sulfided to a sulfur content equivalent to the conversion of at least 35 percent of the active metals present to their sulfides are superior to the catalyst that was untreated following impregnation of the carrier and calcination. Of the sulfided catalysts, the ones containing an amount of sulfur equivalent to that required to convert between about 50 and 63 percent of the metals present to their sulfides produce the highest yield of both 125 and 130 viscosity index oil.

Table 4 shows the results of additional tests made to illustrate the use of a catalyst prepared by stepwise sulfiding and containing a higher percent of sulfur than that shown in any catalyst in Table 3. The high sulfur containing catalyst was prepared by impregnating aqueous ammonium thiotungstate on 10–20 mesh Triple A 25 percent alumina-75 percent silica base which had been previously calcined at 1000° F. for 10 hours. The impregnated support was oven dried at 250° F. for 58 hours and was treated for 8 hours in a 100 percent hydrogen sulfide stream passing over the catalyst at a rate of 6.7 cubic feet per hour per liter of catalyst at a temperature of 600° F. and at atmospheric pressure. After

*Table 4*

| Hydrotreating temperature, °F. | Viscosity index | Iodine number |
|---|---|---|
| 650 | 102 | 6.4 |
| 715 | 117 | 1.8 |
| 730 | 122 | 1.8 |
| 745 | 132 | 1.6 |

| Viscosity index | Yield, percent by volume of charge |
|---|---|
| 125 | 73 |
| 130 | 63 |

Table 4 shows that the high sulfur containing catalyst possesses good activity in respect to viscosity index, iodine number and viscosity index-yield characteristics of the lubricating oil product. However, the high sulfur containing catalyst exhibited poor physical stability since the catalyst tended to break up during operation as evidenced by the fact that 22.7 percent of the catalyst passed through a 20 mesh screen at the completion of the tests as compared to only 4.7 percent passing through a 20 mesh screen when the catalyst was fresh. Also, the catalyst lost a portion of its sulfur content during the tests, the sulfur content dropping from 131 percent to 98 percent of that theoretically required to convert the active metals to their sulfides.

The supported nickel-tungsten catalysts are most effectively employed for the upgrading of lubricating oils or for the hydrogenative treatment of other hydrocarbon charge oils for the production of lubricating oils when the total weight of the nickel and tungsten on the support is between 5 percent and 40 percent of the total catalyst weight and preferably when the weight of the nickel and tungsten is between approximately 10 percent and 25 percent of the total catalyst weight. In addition, it has been found that the atomic ratio of nickel to tungsten on the support is important to the quality of the lubricating oil produced. The ratio of tungsten to nickel should be between 1:0.1 and 1:5 and for best results the atomic ratio of tungsten to nickel in the catalyst should be between approximately 1:0.3 and 1:4.

In further tests made, a portion of the same charge stock used in obtaining the data shown in Table 2 was passed in admixture with hydrogen over a sulfided supported nickel-tungsten catalyst under reaction conditions of 3000 pounds per square inch gauge, a space velocity of 0.5 volume of liquid per hour per volume of catalyst, and a once through pure hydrogen circulation rate of 5000 standard cubic feet of substantially pure hydrogen per barrel. The tests were made at several temperatures in the range between 715° F. to 745° F. The sulfided nickel-tungsten catalysts employed in the tests were impregnated on an American Cyanamid Triple A support. The Triple A support was received in powder form and was pelleted, calcined at 1000° F. and then sized to 10–20 mesh. The total percentage of active metals on the support was varied from 36 percent to 10 percent while maintaining a constant ratio of tungsten to nickel of 1 to 0.5 in each catalyst used. The test results in terms of both viscosity index and iodine number of a lubricating oil product are shown in Table 5.

*Table 5*

| Reactor temperature during test, ° F. | Properties of the treated lubricant | Total percentage by weight of nickel plus tungsten on a 25 percent alumina-75 percent silica support at a constant atomic ratio of 1:0.5 tungsten to nickel | | |
|---|---|---|---|---|
| | | 36 percent | 25 percent | 10 percent |
| 715 | Viscosity index | 111 | 117 | 113.5 |
| | Iodine number | 4.2 | 1.4 | 1.0 |
| 730 | Viscosity index | 117 | 123 | 120 |
| | Iodine number | 4.2 | 1.4 | 1.0 |
| 745 | Viscosity index | | 132 | 128 |
| | Iodine number | 4.2 | 1.4 | 1.0 |

The data presented in Table 5 show that a sulfided nickel-tungsten supported lubricating oil hydrogenation catalyst is improved by the reduction of the amount of active metals impregnated upon the support to 25 percent by weight or less. The best lubricating oil product in terms of both increased viscosity index and decreased iodine number is obtained when either a 25 percent or a 10 percent active metals supported catalyst is employed. Good results are indicated for the range of 10 percent to 25 percent active metals, but best results were achieved when using the 25 percent active metals catalyst. The data show that the best combination of high viscosity index values and low iodine numbers is obtained when a 25 percent sulfided nickel-tungsten supported catalyst is used and that the values obtained with this catalyst are superior to those attained by hydrotreating the lubricating oil in the presence of a supported catalyst containing a higher total active metals content.

Table 6 shows how the viscosity index and iodine number of a lubricating oil product is affected by the ratio of tungsten to nickel in the supported catalyst. Table 6 shows the results of tests made by varying the atomic ratio of tungsten to nickel in the catalyst while holding the total weight percentage of these metals constant. In obtaining the data presented in Table 6, the charge stock and reaction conditions remained unchanged from those outlined for obtaining the data shown in Table 5, the only change being the composition of the catalyst employed. The charge stock comprised two-thirds Ordovician unpressable distillate and one-third Ordovician deasphalted residuum. The hydrotreatment occurred at 3000 pounds per square inch gauge, 0.5 volume of liquid per hour per volume of catalyst, 5000 standard cubic feet of substantially pure hydrogen per barrel and at reaction temperatures of 715° F. and 730° F. The catalyst employed in these further tests contained 25 percent of active metals on an American Cyanamid Triple A 75 percent silica-25 percent alumina support. The catalyst was sulfided. While the total weight percentage of active metals on the support remained constant, the atomic ratios of tungsten to nickel were varied between 1:4 and 1:0.1 in the runs made. The viscosity index and iodine number values of the product resulting from varying the tungsten-nickel atomic ratios is shown in Table 6.

*Table 6*

| Reactor temperature during test, ° F. | Properties of the treated lubricant | Atomic ratio of tungsten to nickel on a 25 percent alumina-75 percent silica support at a constant total weight of 25 percent of nickel plus tungsten on the support | | | | |
|---|---|---|---|---|---|---|
| | | 1:4 | 1:1 | 1:0.5 | 1:0.25 | 1:0.1 |
| 715 | Viscosity index | 118 | 116 | 117 | 116.5 | 118 |
| | Iodine number | 4.4 | 8.8 | 1.2 | 1.2 | 0.8 |
| 730 | Viscosity index | 125 | 126 | 122 | 119 | 119 |
| | Iodine number | 9.4 | 7.8 | 1.2 | 1.8 | 1.6 |

In respect to viscosity index values, Table 6 indicates that a catalyst having at least as much nickel as tungsten is superior since such high-nickel catalysts retain their ring-scission activity under increasingly severe temperature conditions. Table 6 indicates that when the atomic ratio is 1:1, the viscosity index of the hydrogenated lubricating oil product showed the greatest improvement as the reaction temperature was increased from 715° F. to 730° F. At a 1:1 tungsten-nickel atomic ratio, the viscosity index of the oil increased ten points as the reaction temperature was increased from 715° F. to 730° F. The viscosity index increase was only seven points as the nickel content of the supported catalyst was increased to a 1:4 tungsten-nickel ratio. However, Table 6 shows that the effect of decreasing the proportion of nickel was even more detrimental since, as the proportion of nickel to tungsten was decreased to the ratios of 1:0.5, 1:0.25, and 1:0.1, the viscosity index improvement accompanying a reaction temperature increase from 715° F. to 730° F. was only 5, 2.5 and 1, respectively. Accordingly, it is seen that the ratio of tungsten to nickel on the supported catalyst is critical and that best results, from the point of view of ring-scission activity under increasingly severe temperature conditions, are obtained when there is generally at least as much nickel as tungsten on the support and specifically with a tungsten to nickel atomic ratio of between 1:1 and 1:4.

While catalysts having a ratio of from 1:1 to 1:4 tungsten to nickel upon a support were found to be superior to the lower nickel catalysts from the point of view of viscosity index, Table 6 shows that these catalysts are inferior to the lower nickel catalysts in respect to hydrogenation activity for the reduction of iodine number. However, we have discovered that the deficiency in respect to hydrogenation activity in the case of these high nickel catalysts can be overcome by improved catalyst sulfiding conditions.

One method of producing a catalyst of this invention having greatly enhanced hydrogenation activity is to employ a stepwise sulfidation procedure as described previously. This stepwise sulfidation procedure results in a catalyst having an extremely high sulfur content and is capable of producing a lubricating oil having a very low iodine number. However, as mentioned, such a catalyst prepared by a stepwise sulfidation procedure possesses poor physical stability.

Improved sulfiding conditions can also result in a catalyst having enhanced hydrogenation activity when sulfidation occurs following impregnation of the carrier material with the total active metal content. The effect of sulfiding conditions upon the hydrogenation activity of a sulfided supported nickel-tungsten catalyst wherein the total nickel-tungsten content is impregnated prior to sulfidation is illustrated by additional tests in which two independently sulfided 25 percent active metal catalysts, each having a 1:1 ratio of tungsten to nickel on an American Cyanamid Triple A support, were employed to hydrogenate a lubricating oil. The first catalyst was sulfided by treatment with a stream comprising a mixture of 90 percent $H_2$ and 10 percent $H_2S$ for eight hours at 600° F. and one atmosphere. The second catalyst was sulfided by treatment with a stream comprising 100 percent $H_2S$ at 800° F. for 12 hours under at least two atmospheres pressure and contained 119 percent of the sulfur theoretically required to convert all the active metals to their sulfides. The comparison of a catalyst sulfided under the former sulfiding conditions and one prepared under the latter sulfiding conditions in terms of iodine number and yield-viscosity index relationship of a treated lubricating oil is shown in Tables 7 and 8. Portions of the same Ordovician blend used in the tests illustrated in Table 6 were treated in these tests under unchanged reaction conditions, namely 3000 pounds per square inch gauge, 0.5 volume of liquid charge per hour per volume of catalyst and 5000 standard cubic feet of hydrogen per barrel.

*Table 7*

| Lubricating oil hydrogenation temperature, °F. | Property of treated lubricating oil product | Sulfiding conditions of a 25 weight percent nickel-tungsten catalyst having a 1:1 tungsten to nickel ratio on a 75 percent silica-25 percent alumina support | |
|---|---|---|---|
| | | 10 percent $H_2S$, 600° F., 8 hours, 1 atmosphere | 100 percent $H_2S$, 800° F., 12 hours, 2 atmospheres |
| 715 | Iodine number | 8.6 | 3.4 |
| 730 | ----do---- | 7.8 | 2.8 |

*Table 8*

| Viscosity index of treated lubricating oil | Amount of lubricating oil corresponding to each viscosity index | Sulfiding conditions of a 25 weight percent nickel-tungsten catalyst having a 1:1 tungsten to nickel ratio on a 75 percent silica-25 percent alumina support | |
|---|---|---|---|
| | | 10 percent $H_2S$, 600° F., 8 hours, 1 atmosphere | 100 percent $H_2S$, 800° F., 12 hours, 2 atmospheres |
| 120 | Percent by volume | 72 | 78 |
| 125 | ----do---- | 65 | 72.5 |

Table 7 illustrates our discovery that a supported nickel-tungsten catalyst acquires a greater hydrogenation activity when sulfided according to improved conditions. It is seen that when an improved sulfiding technique is employed, the catalyst is capable of producing a lubricating oil having an iodine number of 3.4 as compared to an iodine number of 8.6 when another sulfiding technique is used and the resulting catalysts are employed at a hydrogenation reaction temperature of 715° F. When the hydrogenation reaction temperature is 730° F., the catalyst produced by the improved sulfiding technique is capable of producing a lubricating oil having an iodine number of 2.8 as compared to an iodine number of 7.8 attainable when employing a catalyst prepared by the other sulfiding technique is employed.

Table 8 shows that a 25 percent, 1:1 tungsten to nickel catalyst sulfided under improved conditions is also capable of producing a lubricating oil having an improved yield-viscosity index relationship as compared with a similar catalyst sulfided under other conditions.

Our invention is not limited to the specific sulfiding conditions set forth above. For example, a sulfided nickel-tungsten supported lubricating oil hydrogenation catalyst can be prepared when supported nickel and tungsten in the weight percentages and atomic ratios hereinabove set forth are sulfided in a stream of 1 to 100 per cent hydrogen sulfide, at a temperature of 500° F. to 1000° F., and a pressure of 1 to 10 atmospheres for 2 to 10 hours.

While a 1:1 to 1:4 tungsten to nickel ratio is desirable in order for the catalyst to retain its ring-scission activity as the reaction temperature is increased, it has been found that a slightly lower nickel content is desirable from the point of view of yield-viscosity index relationship of the treated lubricating oil product. Table 9 indicates that in the production of a 120 viscosity index product, a 1:4 tungsten to nickel catalyst yields 68 percent of product; a 1:1 catalyst yields 72 percent of product, a 1:0.5 catalyst, an 82 percent yield of product, and a 1:0.25 catalyst yields 77 percent of product. Therefore, the 1:0.5 tungsten to nickel catalyst is most desirable in regard to yield-viscosity index relationship. Corresponding results are indicated in Table 9 in the production of a 125 viscosity index lubricating oil product. The test catalysts of Table 9 were sulfided.

*Table 9*

| Viscosity index of treated lubricating oil | Amount of lubricating oil product corresponding to each viscosity index | Atomic ratio of tungsten to nickel on a 25 percent alumina-75 percent silica support at a constant total weight of 25 percent of nickel and tungsten on the support | | | |
|---|---|---|---|---|---|
| | | 1:4 | 1:1 | 1:0.5 | 1:0.25 |
| 120 | Percent by volume | 68 | 72 | 82 | 77 |
| 125 | ----do---- | 53 | 65 | 74 | 71 |

As stated above, one method of preparing the supported catalyst compositions of this invention is by impregnation of a carrier followed by sulfiding. For instance, in the preparation of a 25 percent, 1:0.5 tungsten-nickel catalyst, the impregnating solution was prepared from aqueous solutions of nickel nitrate and ammonium meta-tungstate (pH=5) and contained 28.1 percent $WO_3$ and 4.53 percent NiO. This solution was then vacuum impregnated upon an American Cyanamid Triple A 75 percent silica-25 percent alumina base which had been pelleted and sized to 10–20 mesh. The catalysts were then dried at 250° F. for 24 hours and calcined at 1000° F. for 10 hours. The metal content of the final catalyst was 2.46 percent nickel and 21.7 percent tungsten. This is then sulfided for 12 hours at 800° F. at two atmospheres in a stream of 100 percent $H_2S$.

The hydrogenation reaction conditions used in the tests specified in this application are not a limitation upon the reaction conditions under which the catalysts of this invention can be employed. For example, the catalysts of this invention can be employed for the hydrogenation of a deasphalted lubricating oil charge stock within a pressure range of 1500 to 10,000 pounds per square inch gauge. The process pressure should be at least 1500 pounds per square inch gauge to maintain the hydrogenation activity and ring-scission activity which is necessary for the production of a low iodine number and high viscosity index lubricating oil. The process temperature can range from 650° F. to 825° F. Space velocities of 0.25 to 3.0 liquid volumes of hydrocarbon charge per hour per volume of catalyst can be employed. The hydrogen circulation rate can range from 2000 to 15,000 standard cubic feet of hydrogen per barrel. The charge stock which is employed should first be deasphalted and have a Conradson carbon number below approximately 4.5 so that carbon formation during the hydrogenation process will be kept to a minimum, thereby holding to a minimum catalyst aging due to coke formation. The effectiveness of the sulfided supported catalyst of this invention is not limited to any particular charge stock but can be employed to produce an upgraded lubricating oil using as a charge any deasphalted hydrocarbon oil which is heavier than the desired lubricating oil product, such as another lubricating oil, a residuum, or a crude oil.

It is noted that the sulfided catalysts of this invention are highly superior to the same catalysts in the non-sulfided or oxide form. For example, a charge blend comprising two-thirds Ordovician unpressable distillate and one-third deasphalted residuum was charged to separate reactors containing a sulfided catalyst of this invention and a similar non-sulfided catalyst, respectively. The reaction conditions in each reactor were 730° F., 3000 pounds per square inch gauge, 0.5 liquid volume per hour per volume of catalyst and 5000 standard cubic feet of hydrogen per barrel. The products from each reactor were topped to 725° F. Of the product from the reactor containing the sulfided catalyst, 77 percent by volume based on the charge had a viscosity index of 122, while of the product from the reactor containing the non-sulfided catalyst only 71 percent by volume based on the charge had a viscosity index of 122. The product from the reactor containing the sulfided catalyst had an iodine number of 1.8 and an aromatic content of 2.0 while the product of the reactor containing the non-sulfided catalyst had an iodine number of 5.8 and an aromatic content of 6.0. In a separate test in which the only change in conditions was a hydrogenation temperature of 715° F., the product of the reactor containing the sulfided catalyst contained 85 percent by volume based on the charge of 118 viscosity index oil while the product of the reactor containing the non-sulfided catalyst contained only 78.5 percent by volume based on the charge of 118 viscosity index oil. In still another test in which the lubricating oil products were topped to 725° F. and in which the hydrogenation temperature was 750° F., of the product from the reactor containing the sulfided catalyst 58.5 percent by volume based on the charge contained 130 viscosity index oil while of the product of the reactor containing the non-sulfided catalyst only 49.0 percent by volume based on the charge contained 130 viscosity index oil.

EXAMPLE 1

A blend of two-thirds Ordovician unpressable distillate and one-third Ordovician deasphalted residuum having a gravity of 25.1° API, a viscosity of 665 SUV:secs. at 100° F. and 72.8 SUV:secs. at 210° F., a viscosity index of 99 and an iodine number of 14.1 is charged to a hydrogenation reactor employing a sulfided cobalt-molybdenum catalyst upon a 25 percent alumina-75 percent silica support. The cobalt and molybdenum comprise 25 percent of the total catalyst weight and are present in a 1:1 atomic ratio and the catalyst was sulfided with a stream comprising 100 percent hydrogen sulfide at 800° F. and two atmospheres for twelve hours. The reaction is carried out at a temperature of 745° F., a pressure of 3000 pounds per square inch gauge, a space velocity of 0.5 volume of liquid charge per hour per volume of catalyst and a once through substantially pure hydrogen circulation rate of 5000 standard cubic feet per barrel. A lubricating oil product having a high viscosity index and a low iodine number is obtained.

EXAMPLE 2

A blend of two-thirds Ordovician unpressable distillate and one-third Ordovician deasphalted residuum having a gravity of 25.1° API, a viscosity of 665 SUV:secs. at 100° F. and 72.8 SUV:secs. at 210° F., a viscosity index of 99 and an iodine number of 14.1 is charged to a hydrogenation reactor employing a sulfided iron-chromium catalyst upon a 15 percent alumina-85 percent silica support. The iron and chromium comprise 10 percent of the total catalyst weight and are present in a 1:0.5 atomic ratio of chromium to iron and the catalyst was sulfided with a stream comprising 100 percent hydrogen sulfide at 800° F. and two atmospheres for twelve hours. The reaction is carried out at a temperature of 715° F., a pressure of 3500 pounds per square inch gauge, a space velocity of one liquid volume of charge per hour per volume of catalyst and a once through substantially pure hydrogen circulation rate of 4000 standard cubic feet per barrel. A high viscosity index, low iodine number lubricating oil product is obtained.

Various changes and modifications may be made without departing from the spirit of this invention and the scope thereof as defined in the following claims.

We claim:

1. The process for producing an improved lubricating oil having a relatively high viscosity index which comprises in combination contacting a lubricating oil charge stock selected from the group consisting of deasphalted residuum and unpressable distillate with hydrogen and a catalyst consisting essentially of a mixture of a sulfide of a metal of the left-hand column group VI with a sulfide of a member of the group consisting of iron, cobalt and nickel, said catalyst being supported upon a carrier having an activity for cracking corresponding to a rating of between about 12 percent and 80 percent on the Kellogg activity scale, said contacting taking place at a temperature of between about 650° and 825° F., at a pressure of between about 1500 and 10,000 p.s.i.g., at a space velocity of between about 0.25 and 3.0 liquid volumes of lubricating oil charge stock per hour per volume of catalyst, at a hydrogen recycle rate of between about 2,000 and 15,000 standard cubic feet of hydrogen per barrel of lubricating oil charge stock, and separating a high quality lubricating oil fraction from the reaction product.

2. The process for producing an improved lubricating oil having a relatively high viscosity index which comprises in combination contacting a lubricating oil charge stock selected from the group consisting of deasphalted residuum and unpressable distillate with hydrogen and a catalyst which is substantially free of calcium and consisting essentially of a mixture of a sulfide of a metal of the left-hand column group VI with a sufide of a member of the group consisting of iron, cobalt and nickel, said catalyst being supported upon a carrier having an activity for cracking corresponding to a rating of between about 12 percent and 80 percent on the Kellogg activity scale, said contacting taking place at a temperature of between about 650° and 825° F., at a pressure of between about 1500 and 10,000 p.s.i.g., at a space velocity of between about 0.25 and 3.0 liquid volumes of lubricating oil charge stock per hour per volume of catalyst, at a hydrogen recycle rate of between about 2,000 and 15,000 standard cubic feet of hydrogen per barrel of lubricating oil charge stock, and separating a high quality lubricating oil fraction from the reaction product.

3. The process for producing an improved lubricating oil having a relatively high viscosity index which comprises in combination contacting a high viscosity lubricating oil charge stock selected from the group consisting of deasphalted residuum and unpressable distillate with hydrogen and a catalyst consisting essentially of a mixture of a sulfide of a metal of the left-hand column group VI with a sulfide of a member of the group consisting of iron, cobalt and nickel, said catalyst being supported upon a carrier having an activity for cracking corresponding to a rating of between about 35 percent and 80 percent on the Kellogg activity scale, said contacting taking place at a temperature of between about 650° and 825° F., at a pressure of between about 1500 and 10,000 p.s.i.g., at a space velocity of between about 0.25 and 3.0 liquid volumes of lubricating oil charge stock per hour per volume of catalyst, at a hydrogen recycle rate of between about 2,000 and 15,000 standard cubic feet of hydrogen per barrel of lubricating oil charge stock, and separating a high quality lubricating oil fraction from the reaction product, said separated fraction having a lower viscosity than the charge stock and a substantially higher viscosity index.

4. The process for producing an improved lubricating oil having a relatively high viscosity index which comprises in combination contacting a lubricating oil charge stock selected from the group consisting of deasphalted residuum and unpressable distillate with hydrogen and a catalyst consisting essentially of a mixture of a sulfide of a metal of the left-hand column group VI with a sulfide of a member of the group consisting of iron, cobalt and nickel, said catalyst being supported upon a silica-alumina carrier having an activity for cracking corresponding to a rating of between about 12 percent and 80 percent on the Kellogg activity scale, said contacting taking place at a temperature of between about 650° and 825° F., at a pressure of between about 1500 and 10,000 p.s.i.g., at a space velocity of between about 0.25 and 3.0 liquid volumes of lubricating oil charge stock per hour per volume of catalyst, at a hydrogen recycle rate of between about 2,000 and 15,000 standard cubic feet of hydrogen per barrel of lubricating oil charge stock, and separating a high quality lubricating oil fraction from the reaction product.

5. The process for producing an improved lubricating oil having a relatively high viscosity index which comprises in combination contacting a deasphalted residual lubricating oil charge stock with hydrogen and a catalyst consisting essentially of a mixture of between about 10 and 25 percent of a sulfide of a metal of the left-hand column group VI with a sulfide of a member of the group consisting of iron, cobalt and nickel, said catalyst being supported upon a carrier having an activity for cracking corresponding to a rating of between about 12 percent and 80 percent on the Kellogg activity scale, said contacting taking place at a temperature of between about 650° and 825° F., at a pressure of between about 1500 and 10,000 p.s.i.g., at a space velocity of between about 0.25 and 3.0 liquid volumes of lubricating oil charge stock per hour per volume of catalyst, at a hydrogen recycle rate of between about 2,000 and 15,000 standard cubic feet of hydrogen per barrel of lubricating oil charge stock, and separating a high quality lubricating oil fraction from the reaction product.

6. The process for producing an improved lubricating oil having a relatively high viscosity index which comprises in combination contacting an unpressable distillate lubricating oil charge stock with hydrogen and a catalyst which is substantially free of calcium and consisting essentially of a mixture of a sulfide of a metal of the left-hand column group VI with a sulfide of a member of the group consisting of iron, cobalt and nickel, said catalyst being supported upon a carrier having an activity for cracking corresponding to a rating of between about 12 percent and 80 percent on the Kellogg activity scale, said contacting taking place at a temperature of between about 650° and 825° F., at a pressure of between about 1500 and 10,000 p.s.i.g., at a space velocity of between about 0.25 and 3.0 liquid volumes of lubricating oil charge stock per hour per volume of catalyst, at a hydrogen recycle rate of between about 2,000 and 15,000 standard cubic feet of hydrogen per barrel of lubricating oil charge stock, and separating a high quality lubricating oil fraction from the reaction product.

7. The process for producing an improved lubricating oil having a relatively high viscosity index which comprises in combination contacting a deasphalted lubricating oil charge stock with hydrgen and a catalyst consisting essentially of a mixture of a sulfide of a metal of the left-hand column group VI with a sulfide of a member of the group consisting of iron, cobalt and nickel, said catalyst being supported upon a silica-alumina carrier having an activity for cracking corresponding to a rating of between about 35 percent and 80 percent on the Kellogg activity scale and containing sulfur in an amount corresponding to between about 50 and 63 percent of the theoretical sulfide content, said contacting taking place at a temperature of between about 650° and 825° F., at a pressure of between about 1500 and 10,000 p.s.i.g., at a space velocity of between about 0.25 and 3.0 liquid volumes of lubricating oil charge stock per hour per volume of catalyst, at a hydrogen recycle rate of between about 2,000 and 15,000 standard cubic feet of hydrogen per barrel of lubricating oil charge stock, and separating a high quality lubricating oil fraction from the reaction product.

References Cited in the file of this patent

UNITED STATES PATENTS

| | | |
|---|---|---|
| 2,365,029 | Voorhies | Dec. 12, 1944 |
| 2,904,500 | Beuther et al. | Sept. 15, 1959 |
| 2,904,505 | Cole | Sept. 15, 1959 |
| 2,905,636 | Watkins et al. | Sept. 22, 1959 |
| 2,917,448 | Beuther et al. | Dec. 15, 1959 |
| 2,960,458 | Beuther et al. | Nov. 15, 1960 |